(12) United States Patent
Arvin et al.

(10) Patent No.: US 10,388,418 B2
(45) Date of Patent: Aug. 20, 2019

(54) WEARABLE ARTICLES FOR REPELLING DECAY PRODUCTS GENERATED FROM RADON

(71) Applicant: INTERNATIONAL BUSINESS MACHINES CORPORATION, Armonk, NY (US)

(72) Inventors: Charles L. Arvin, Poughkeepsie, NY (US); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/216,270

(22) Filed: Dec. 11, 2018

(65) Prior Publication Data
US 2019/0122778 A1   Apr. 25, 2019

Related U.S. Application Data

(62) Division of application No. 15/700,831, filed on Sep. 11, 2017, now Pat. No. 10,236,089.

(51) Int. Cl.
*G21F 5/06* (2006.01)
*G21F 3/02* (2006.01)
(Continued)

(52) U.S. Cl.
CPC .............. *G21F 5/06* (2013.01); *B01D 49/00* (2013.01); *G21F 1/12* (2013.01); *G21F 3/02* (2013.01); *G21F 9/02* (2013.01)

(58) Field of Classification Search
CPC .......... A61L 2209/14; A61L 2/10; A61L 9/00; A61L 9/16; A61L 9/22; B03C 2201/10; B03C 3/08; B03C 3/09; B03C 3/12; B03C 3/155; B03C 3/368; B03C 3/41; B03C 3/47; F24F 2003/1614; F24F 2003/1625;
(Continued)

(56) References Cited

U.S. PATENT DOCUMENTS 5,148,002 A  *  9/1992  Kuo ..................... H01Q 1/273
                                                          219/211
7,320,947 B2 *  1/2008  Child .................... B32B 5/24
                                                          442/110
(Continued)

FOREIGN PATENT DOCUMENTS

CN          2497326 Y      6/2002
CN          1443496 A      9/2003
(Continued)

*Primary Examiner* — David A Vanore
(74) *Attorney, Agent, or Firm* — Tutunjian & Bitetto, P.C.; Kevin Michael Jordan

(57) ABSTRACT

A method is presented for collecting and removing radon from a confined area, a storage box or articles of clothing. The method includes collecting radon from the confined area or around a storage box via at least one collector, connecting each of a plurality of radon adsorbers to a corresponding power supply or power source such as a battery, capacitor, fuel cell, etc. diverting, via a plurality of valves, the collected radon or radon daughters through one or more of the plurality of radon adsorbers, and receiving, via a plurality of radon storage units, radon or radon daughters held by the plurality of radon adsorbers for a predetermined period of time.

8 Claims, 5 Drawing Sheets

(51) Int. Cl.
*G21F 1/12* (2006.01)
*B01D 49/00* (2006.01)
*G21F 9/02* (2006.01)

(58) Field of Classification Search
CPC ....... F24F 2003/1628; F24F 2003/1667; F24F 2003/1682; F24F 3/166
USPC ............... 422/122; 95/69, 70, 55; 250/516.1
See application file for complete search history.

(56) References Cited

U.S. PATENT DOCUMENTS

| | | | |
|---|---|---|---|
| 7,381,244 B2 | 6/2008 | Tyndall et al. | |
| 7,592,276 B2 * | 9/2009 | Hill | D02G 3/441 313/511 |
| 7,777,156 B2 * | 8/2010 | Rock | A41D 31/0038 219/211 |
| 8,823,395 B2 * | 9/2014 | Bhattacharya | D03D 1/0088 198/810.02 |
| 9,103,752 B1 | 8/2015 | Maanum | |
| 9,278,304 B2 | 3/2016 | Lee | |
| 9,386,684 B2 * | 7/2016 | Sime | A61B 5/04085 |
| 2007/0049147 A1 * | 3/2007 | Hill | D03D 1/0088 442/181 |
| 2008/0083721 A1 * | 4/2008 | Kaiserman | A43B 3/0005 219/211 |
| 2009/0057290 A1 * | 3/2009 | Williams | H05B 3/342 219/211 |
| 2013/0176737 A1 * | 7/2013 | Zhou | H05K 1/038 362/249.06 |
| 2016/0095369 A1 * | 4/2016 | Roberts | A41D 19/01535 2/160 |
| 2017/0086513 A1 * | 3/2017 | Maxey | A41D 13/0051 |

FOREIGN PATENT DOCUMENTS

| | | |
|---|---|---|
| CN | 101658744 B | 8/2013 |
| CN | 203550057 U | 4/2014 |
| CN | 204494613 U | 7/2015 |
| DE | 19503173 A1 | 8/1996 |
| DE | 102015011374 B3 | 11/2016 |
| JP | 10186036 A | 7/1998 |
| WO | 2014/025707 A2 | 2/2014 |

* cited by examiner

WEARABLE ARTICLES FOR REPELLING DECAY PRODUCTS GENERATED FROM RADON

BACKGROUND

Technical Field

The present invention relates generally to a system and method for removing radon from the environment.

Description of the Related Art

Radon gas is a naturally occurring radioactive noble gas. It has long been recognized that exposure to radon gas (and radon gas "daughters" that occur as a result of radon gas decay) can pose a significant health hazard. Although testing for radon gas has been performed for many years, until recently, concern over exposure to radon gas was primarily associated with workers in the uranium mining industry or others whose work brought them in contact with uranium ore. In recent years, it has been recognized that radon gas can seep out of the ground through building foundations and can accumulate inside buildings. When radon gas accumulates in a human environment, it can be inhaled, thereby exposing the lungs to radioactivity.

SUMMARY

In accordance with an embodiment, a system is provided for collecting and removing radon from a confined area. The system includes at least one collector for collecting radon from the confined area, a plurality of radon adsorbers each connected to a corresponding power supply, a plurality of valves for diverting the collected radon through one or more of the plurality of radon adsorbers, and a plurality of radon storage units for receiving radon held by the plurality of radon adsorbers for a predetermined period of time.

In accordance with an embodiment, a method is provided for collecting and removing radon from a confined area. The method includes collecting radon from the confined area via at least one collector, connecting each of a plurality of radon adsorbers to a corresponding power supply, diverting, via a plurality of valves, the collected radon through one or more of the plurality of radon adsorbers, and receiving, via a plurality of radon storage units, radon held by the plurality of radon adsorbers for a predetermined period of time.

In accordance with another embodiment, a method is provided for collecting and removing radon from a confined area. The method includes incorporating a plurality of radon adsorbers within a structure of the confined area, negatively biasing the plurality of radon adsorbers within the structure, and attracting the radon on surfaces of the plurality of radon adsorbers.

In accordance with another embodiment, a wearable article for repelling radon is presented. The wearable article includes an inner protective layer having an inner surface and an outer surface, the inner surface configured to contact a user and an outer protective layer configured to contact at least a portion of the outer surface of the inner protective layer. The outer protective layer repels radon.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
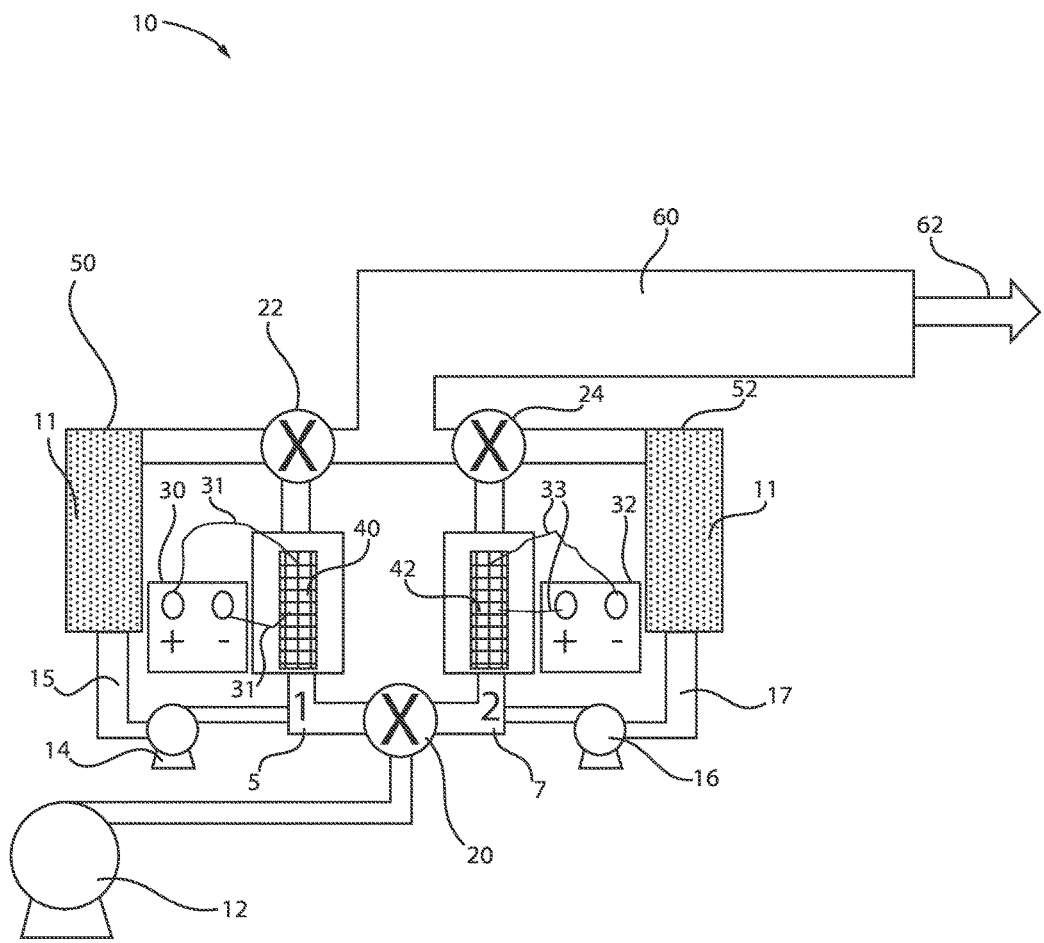
FIG. 1 is a filtration system for collecting and removing radon from a confined area, in accordance with an embodiment of the present invention.

Embodiments in accordance with the present invention provide methods and devices for collecting and removing a noble gas from a confined area. The noble gas can be, e.g., radon. Radon is a chemical element with symbol Rn and atomic number 86. It is a radioactive, colorless, odorless, tasteless noble gas, occurring naturally as a decay product of radium. Radon's most long-lived isotope, $^{222}$Rn has a half-life of 3.8 days. This isotope of radon is formed as one intermediate step in the normal radioactive decay chain through which uranium slowly decays into a stable isotope of lead, $^{206}$Pb. Unlike all the other intermediate elements, radon is gaseous and easily inhaled. Thus, naturally-occurring radon is responsible for the majority of public exposure to ionizing radiation. Radon is often the single largest contributor to an individual's background radiation dose, and is most variable from location to location. Despite its short lifetime, some radon gas from natural sources can accumulate to far higher than normal concentrations in buildings, especially in low areas such as basements and crawl spaces due to its heavy nature. As radon itself decays, it produces new radioactive isotopes called radon daughters or decay products or radon progeny. Unlike gaseous radon itself, radon daughters are solids and stick to surfaces, such as dust particles in air. If such contaminated dust is inhaled, these particles can stick to airways of the lung and increase a risk of developing lung cancer.

Embodiments in accordance with the present invention provide methods and devices for collecting and removing or sequestering radon. If radon is sequestered for a number of days, then radon could be converted to a solid which results in a 10,000 volume reduction.

Embodiments in accordance with the present invention provide methods and devices for implementing air handling filters for collecting and removing or sequestering radon from a structure, such as a building. A series of biased metal meshes, gas flow collectors, and diverting valves can be used to divert gas or radon from a building or home by electrodes where they are negatively biased to collect the radon (Rn). This enables collection of Rn as opposed to simply venting it to the outdoors.

Embodiments in accordance with the present invention provide methods and devices for creating a biased mesh to be incorporated or embedded within clothing, sports equipment, and first responders' gear to prevent Rn from adsorbing to the surface of such wearable articles and/or items. The majority of Radon daughter isotopes have a positive electrical charge. Thus, devices can be used to repel or attach the daughters based on their electrical charge. As a result, toxic species are not adhered to outer surfaces of clothing, equipment, and/or gear that would easily be breathed in immediately after, e.g., a fire. The biased mesh can be used in clothing or equipment or gear related to a number of recreational or sports activities, as well as in compression bonds, breathing apparatuses, where the metal mesh is positively biased to repel Rn.

Embodiments in accordance with the present invention provide methods and devices for implementing metal mesh in concrete structures. For example, metal meshes can be negatively biased, to attract the radon daughters, and can be incorporated or embedded within concrete structures. Rn in the atmosphere or environment can be adsorbed onto or in proximity to the metal mesh. The polarization of the metal mesh can be maintained negatively for weeks, months, or years at a time. The half-life of $^{222}$Rn is 3.8 days. The decay products are solids. Thus, it is only necessary to maintain the Rn long enough to allow the decay process to convert radon gas to solid materials that can no longer cause a threat.

Embodiments in accordance with the present invention provide methods and devices for implementing radon detectors that are made with biased meshes to collect and allow Rn to form a solid. After enough time, the meshes could either be sent to a lab to test or measured locally.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this invention.

FIG. 1 is a filtration system for collecting and removing radon from a confined area, in accordance with an embodiment of the present invention.

The filtration system 10 includes a plurality of collectors 12, 14, 16. The plurality of collectors 12, 14, 16 are configured to collect radon, from the atmosphere or environment. The filtration system 10 further includes a plurality of diverting valves 20, 22, 24. The filtration system 10 also includes a first metal mesh 40 and a second metal mesh 42. The first metal mesh 40 is connected to a first power supply 30 via cables 31 and the second metal mesh 42 is connected to a second power supply 32 via cables 33. The first metal mesh 40 is connected between the first diverting valve 20 and the second diverting valve 22, whereas the second metal mesh 42 is connected between the first diverting valve 20 and the third diverting valve 24. Radon can flow from the first diverting valve 20, via channel 5, to the first metal mesh 40 and radon can flow from the first diverting valve 20, via channel 7, to the second metal mesh 42.

The filtration system 10 also includes a plurality of radon storage units 50, 52. The storage units can be, e.g., zeolite chambers 50, 52. The first zeolite chamber 50 is connected between the radon collector 14 and the second diverting valve 22, whereas the second zeolite chamber 52 is connected between the radon collector 16 and the third diverting valve 24. The zeolite chambers 50, 52 are configured to store radon 11.

The filtration system 10 also includes a main air handler 60 through which air is output 62 without radon since the radon has been either attracted to the first and second metal meshes 40, 42 or sequestered within the zeolite chambers 50, 52.

In operation, in a first stage, the diverting valves 20, 22, 24 are configured such that air flows through the channel 5. Thus, the collector 12 collects air with radon and supplies it to the first metal mesh 40 via channel 5. The first metal mesh 40 is biased via the first power supply 30. For example, the first metal mesh 40 is negatively biased in order to collect or attract any radon daughters detected within the air collected by the collector 12. The remainder of the air flows to the main air handler 60 and is output 62.

In operation, in a second stage, the diverting valves 20, 22, 24 are configured such that air flows through channel 7. Thus, the collector 12 collects air with radon and supplies it to the second metal mesh 42 via channel 7. The second metal mesh 42 is biased via the second power supply 32. For example, the second metal mesh 42 is negatively biased in order to collect or attract any radon daughters detected within the air collected by the collector 12. The remainder of the air flows to the main air handler 60 and is output 62. In the meantime, the first power supply 30 is reverse biased (to be regenerated). For example, the first power supply 30 is positively biased such that the collected radon daughters is now repelled from the first metal mesh 40. The collector 14 causes the repelled radon daughters to travel to the first zeolite chamber 50 where it is stored. The radon daughters 11 travel to the first zeolite chamber 50 via channel 15. The radon daughters 11 are sequestered in the first zeolite chamber 50. After all the radon daughters 11 are repelled from the first metal mesh 40 and stored in the first zeolite chamber 50, the diverting valves 20, 22, 24 can be configured back to their original configuration.

In operation, in a third stage, the diverting valves 20, 22, 24 are configured such that air flows back through channel 5 (and air supply through channel 7 is cut off). Thus, the collector 12 collects air with radon and supplies it to the first metal mesh 40 via channel 5. The first metal mesh 40 is biased via the first power supply 30. For example, the first metal mesh 40 is once again negatively biased (switched back from the positive change in the second stage) in order to one again collect or attract any radon daughters detected within the air collected by the collector 12. The remainder of the air flows to the main air handler 60 and is output 62.

Of course, it is contemplated that the reverse is true. For example, the first stage can involve diverting valves 20, 22, 24 to be configured such that air flows through the channel 7. Thus, the collector 12 collects air with radon and supplies it to the second metal mesh 42 via channel 7. The second metal mesh 42 is biased via the second power supply 32. For example, the second metal mesh 42 is negatively biased in order to collect or attract any radon daughters detected within the air collected by the collector 12. The remainder of the air flows to the main air handler 60 and is output 62.

Thereafter, in the second stage, the diverting valves 20, 22, 24 can be configured such that air flows through channel 5. Thus, the collector 12 collects air with radon and supplies it to the first metal mesh 40 via channel 5. The first metal mesh 40 is biased via the first power supply 30. For example, the first metal mesh 40 is negatively biased in order to collect or attract any radon detected within the air collected by the collector 12. The remainder of the air flows to the main air handler 60 and is output 62. In the meantime, the second power supply 32 is reverse biased (to be regenerated). For example, the second power supply 32 is positively biased such that the collected radon daughters are now repelled from the second metal mesh 42. The collector 16 causes the repelled radon daughters to travel to the second zeolite chamber 52 where it is stored. The radon daughters 11 travel to the second zeolite chamber 52 via channel 17. The radon daughters 11 are sequestered in the second zeolite chamber 52. After all the radon daughters 11 are repelled from the second metal mesh 42 and stored in the second zeolite chamber 52, the diverting valves 20, 22, 24 can be configured back to their original configuration.

In one exemplary embodiment, a monitoring system or a detecting device can be positioned at the output of the first and second zeolite chambers 50, 52 that periodically charge another metal mesh negatively (not shown) to monitor, e.g., alpha particle emissions. In this way, it can be determined whether the zeolite of the zeolite chambers 50, 52 is full and needs to be replaced.

In another exemplary embodiment, the radon daughters can be held by the metals meshes 40, 42 or the zeolite chambers 50, 52 for example for 30 days (approximately seven ½-lives). The zeolite chambers 50, 52 can be replaced every 30 days or 60 days or 90 days, etc. One skilled in the art can contemplate a plurality of different scenarios for replacing the zeolite chambers 50, 52. In another exemplary embodiment, the metal meshes 40, 42 can simply be discarded from this configuration.

Figure 2:
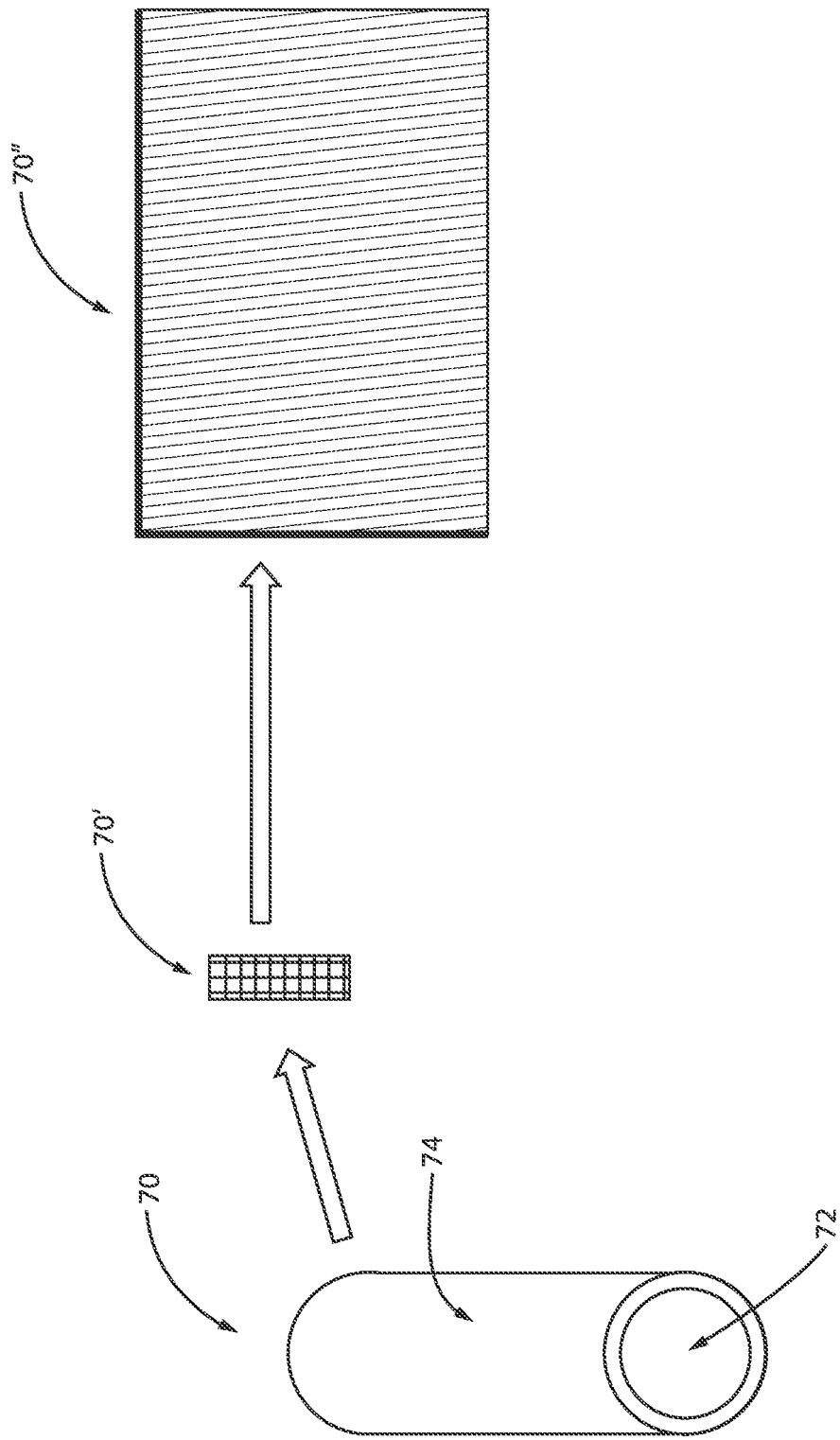
FIG. 2 is a biased metal mesh to be used in clothing, equipment, and gear, in accordance with another embodiment of the present invention.

FIG. 2 is a biased metal mesh to be used in clothing, equipment, and gear, in accordance with another embodiment of the present invention.

The metal fibers 70 can include a core 72 and a casing 74. The core 72 can be constructed from a first metal, whereas the casing 74 can be constructed from a second metal, where the first and second metals are different. When two conductors are placed together, the electrons are free to move and cause the stack to come to a same Fermi level. This leads to one of the metals being positively biased and the other negatively biased. Thus, by placing the metal with a lower Fermi level in the core 72, it leads to the metal on the outer casing 74 to become positively biased. The core metal 72 can be, e.g., a variety of different steel or steel alloys. The casing metal 74 can be, e.g., zinc (Zn). The thickness of the casing 74 can be from about 5 nm to about 100 nm.

These metal fibers 70 can be combined to form a metal mesh 70'. The metal mesh 70' can be constructed as a fabric as shown in 70". The fabric 70" can be used in clothing or equipment or gear. The equipment can be, e.g., recreational equipment or sports equipment or camping equipment. The gear can be, e.g., military gear or first responder gear. Of course, one skilled in the art can contemplate incorporating the biased mesh into any type of clothing, garments, articles, apparel, outfits, equipment, gear, accessories, fixtures, appliances, machinery, tools, supplies, etc. The biased mesh would prevent radon daughters from adsorbing to the surface of such items by creating a positive charge via the casing 74. This is especially important if the equipment or gear is stored for any great length of time.

Figure 3:
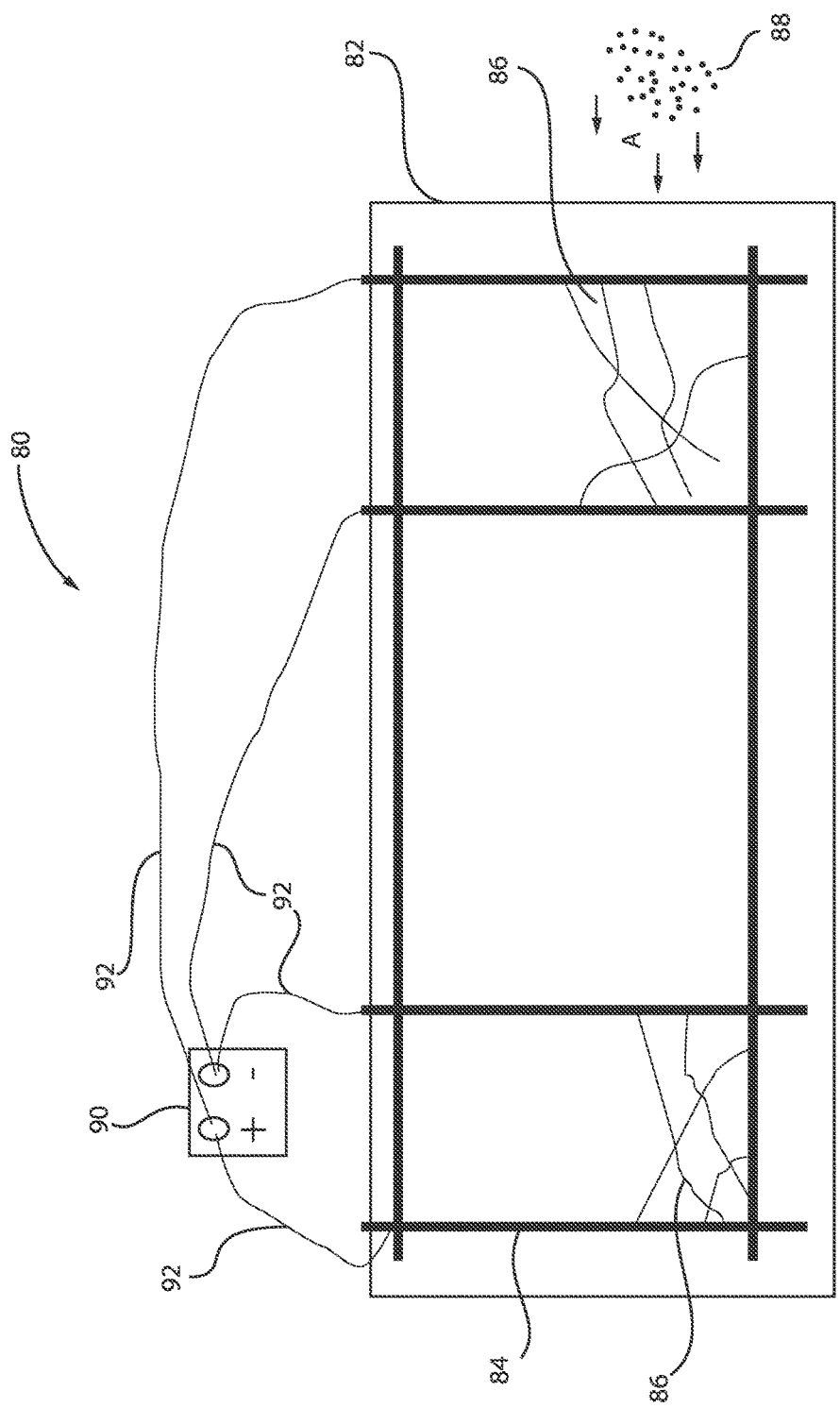
FIG. 3 is a metal mesh incorporated in concrete structures and connected to at least one power supply for adsorbing radon, in accordance with another embodiment of the present invention.

FIG. 3 is a metal mesh incorporated in concrete structures and connected to at least one power supply for adsorbing radon daughters, in accordance with another embodiment of the present invention.

The system 80 depicts a concrete structure 82 including a plurality of rods or shafts 84 (or connecting members) that are interconnected to hold and stabilize the metal mesh 86. At least one power supply 90 can be connected to the metal mesh 86 via cables 92. When the metal mesh 86 is negatively biased by the at least one power supply 90, radon daughters 88 are adsorbed or attracted to the outer surface of the concrete structure 82. The polarization can be maintained negatively for days or weeks or months or even years. The radon 88 can be continuously collected on the outer surface of the concrete structure where it can become solid after a predetermined time period. It is only necessary to maintain the Rn long enough to allow the decay process to convert the gas to a solid that can no longer cause a threat via inhalation.

Figure 4:
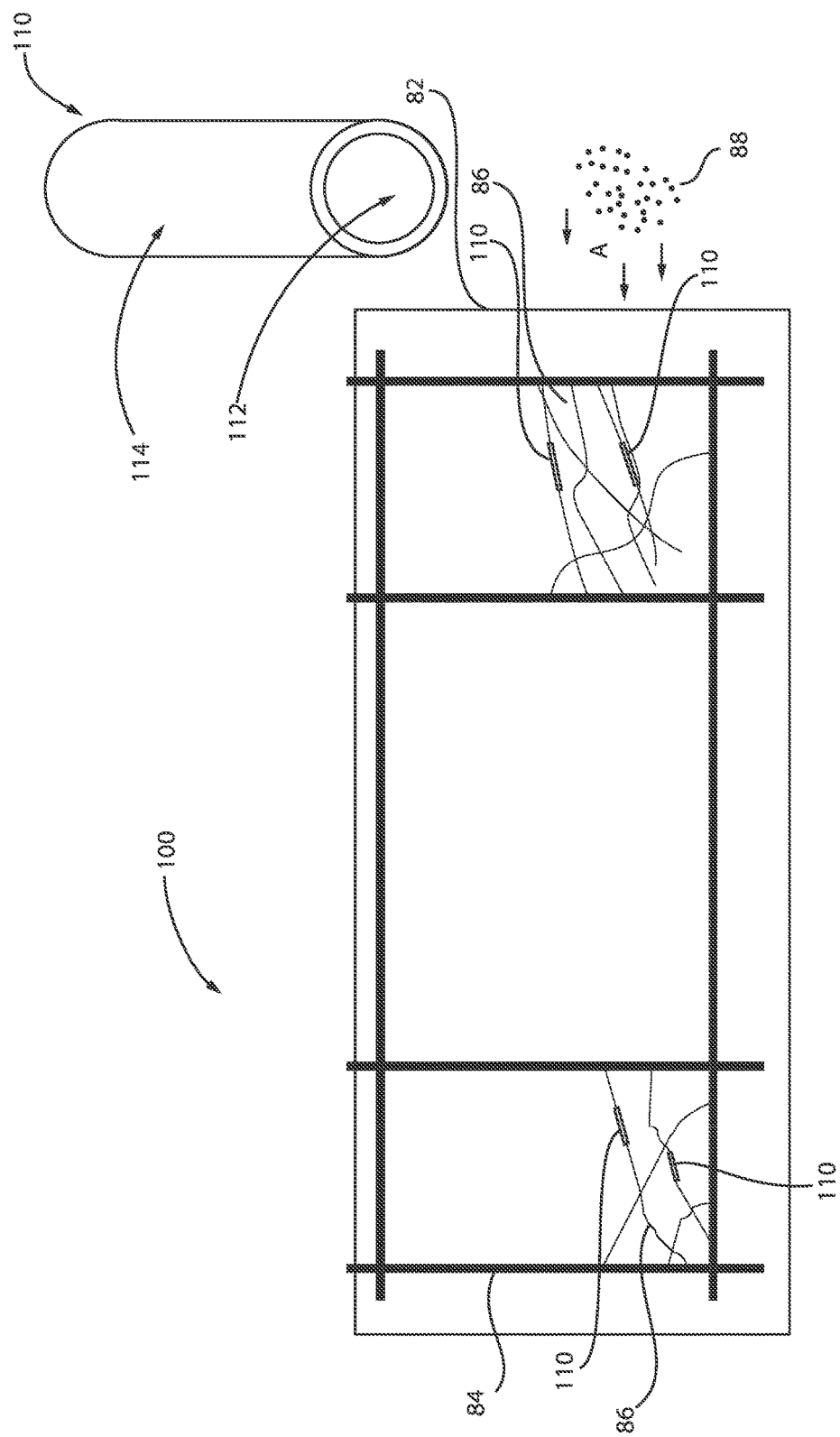
FIG. 4 is a metal mesh incorporated in concrete structures and coated with a metal for adsorbing radon, in accordance with another embodiment of the present invention.

FIG. 4 is a metal mesh incorporated in concrete structures and coated with a metal for adsorbing radon daughters, in accordance with another embodiment of the present invention.

The system 100 depicts a concrete structure 82 including a plurality of rods or shafts 84 (or connecting members) that are interconnected to hold and stabilize the metal mesh 86. The metal mesh 86 can be coated with a plurality of metal fibers 110, where each metal fiber 110 includes a core 112 and a casing 114. The metal mesh 86 can be permanently negatively biased by the metal fibers 110 coated thereon, and thus radon daughters 88 are adsorbed or attracted to the outer surface of the concrete structure 82. The polarization can be maintained negatively for days or weeks or months or even years. The radon daughters 88 can be continuously collected on the outer surface of the concrete structure where it can become solid after a predetermined time period. The core 112 can be constructed from a different variety of steel or steel alloys. The casing metal 114 can be, e.g., iron-nickel (NiFe) alloy or nickel-phosphorus (NiP) alloy. The thickness of the casing 114 can be from about 5 nm to about 100 nm.

In another exemplary embodiment, the metal meshes can be biased by other means, such as a battery or capacitor or galvanic couples.

Figure 5:
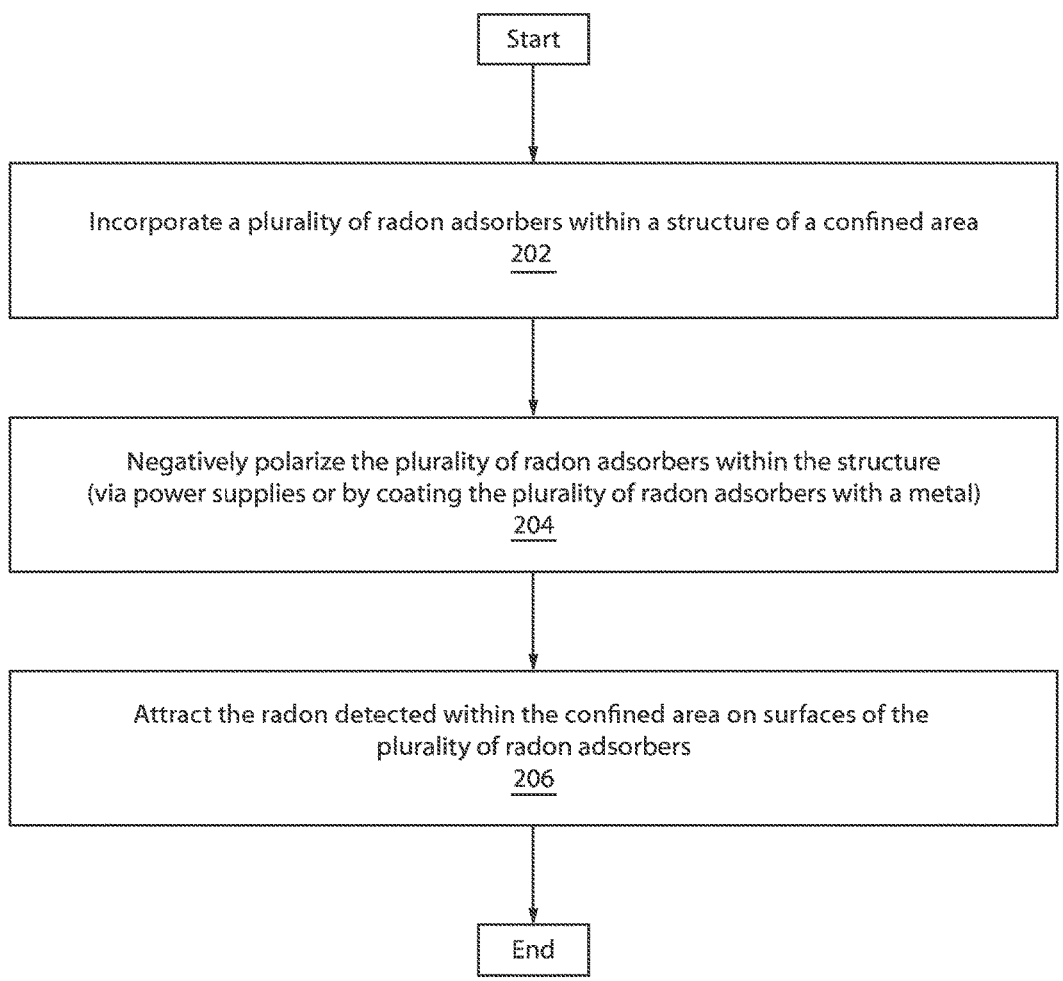
FIG. 5 is a block/flow diagram of an exemplary method for collecting and removing radon from a confined area, in accordance with an embodiment of the present invention.

FIG. 5 is a block/flow diagram of an exemplary method for collecting and removing radon from a confined area, in accordance with an embodiment of the present invention.

At block 202, a plurality of radon adsorbers are incorporated or embedded within a structure of a confined area. The structure can be, e.g., a building.

At block 204, the plurality of radon adsorbers are negatively biased within the structure (via one or more power supplies or by coating the plurality of radon adsorbers with a metal having a core (first metal) and a coating (second metal)).

At block 206, the radon detected within the confined area on surfaces of the plurality of radon adsorbers is attracted to the plurality of radon adsorbers.

In summary, radon (Rn) daughters adsorb to negatively biased species, even though it is a neutral species itself. Rn converts to a solid within 4 days (half-life of 3.8 days). In one exemplary embodiment, surfaces of metal meshes can be modulated by, e.g., a power supply connected thereto, to attract radon and convert it to a solid by holding it biased for a predetermined period of time. Alternatively, the surfaces of metal meshes can be modulated to attract radon daughters and to concentrate it by reversing the charge of the power supply to have the radon daughters flow into zeolite chambers (or other metal mesh) for long-term storage. Once all the radon daughters have been transferred to the long-term storage units or chambers, the power supply can be reversely connected to the metal mesh so that the metal mesh is negatively biased to re-collect new Rn by one or more collectors. In another exemplary embodiment, metal mesh can be incorporated or embedded within or attached to outer surfaces of clothing or equipment or gear such that the surface charge is positive to repel Rn. The metal mesh can be constructed by cladding a metal so that the core metal pulls electrons within in order to create a positive charge on the outer surface of the mesh. In yet another exemplary embodiment, a radon detector can be constructed such that a small kit that is biased would allow collection of radon daughters and its subsequent transformation to a solid. The solid could then be detected with a detector or with a Geiger counter in the field.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network).

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present embodiments. The compounds with additional elements will be referred to herein as alloys.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of a system and method for collecting and removing radon from the atmosphere, the environment, and or one or more confined areas (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims.

Having thus described aspects of the invention, with the details and particularity required by the patent laws, what is claimed and desired protected by Letters Patent is set forth in the appended claims.

What is claimed is:

1. A wearable article for preventing decay products produced from radon from adsorbing to an outer surface of the wearable article, the wearable article comprising:
    an inner protective layer having an inner surface and the outer surface, the inner surface configured to contact a user; and
    an outer protective layer configured to contact at least a portion of the outer surface of the inner protective layer;
    wherein the outer protective layer includes a polarized metal mesh to force surface charge to be positive to prevent the decay products from adsorbing to the outer surface of the wearable article.

2. The wearable article of claim 1, wherein the polarized metal mesh is constructed by cladding a metal so that a core metal pulls electrons to create the positive charge on the outer surface of the wearable article.

3. A wearable article for preventing decay products produced from radon from adsorbing to an outer surface of the wearable article, the wearable article comprising:
    an inner protective layer having an inner surface and an outer surface, the inner surface configured to contact a user; and
    an outer protective layer configured to contact at least a portion of the outer surface of the inner protective layer;
    wherein the outer protective layer is constructed from metal fibers to force surface charge to be positive to prevent the decay products from adsorbing to the outer surface of the wearable article.

4. The wearable article of claim 3, wherein the metal fibers include a core and a casing.

5. The wearable article of claim 4, wherein the core is constructed from a first metal and the casing is constructed from a second metal.

6. The wearable article of claim 5, wherein the first metal is different than the second metal.

7. The wearable article of claim 5, wherein the first metal is steel and the second metal is zinc.

8. The wearable article of claim 5, wherein a thickness of the casing is from about 5 nm to about 100 nm.

* * * * *